United States Patent
Wang et al.

(10) Patent No.: US 11,308,937 B2
(45) Date of Patent: Apr. 19, 2022

(54) METHOD AND APPARATUS FOR IDENTIFYING KEY PHRASE IN AUDIO, DEVICE AND MEDIUM

(71) Applicant: BEIJING BAIDU NETCOM SCIENCE AND TECHNOLOGY CO., LTD., Beijing (CN)

(72) Inventors: Zhihua Wang, Beijing (CN); Tianxing Yang, Beijing (CN); Zhipeng Wu, Beijing (CN); Bin Peng, Beijing (CN); Chengyuan Zhao, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 145 days.

(21) Appl. No.: 16/530,853

(22) Filed: Aug. 2, 2019

(65) Prior Publication Data

US 2020/0058291 A1 Feb. 20, 2020

(30) Foreign Application Priority Data

Aug. 20, 2018 (CN) .......................... 201810949733.8

(51) Int. Cl.
*G10L 15/06* (2013.01)
*G06F 40/289* (2020.01)
*G10L 15/26* (2006.01)

(52) U.S. Cl.
CPC .......... *G10L 15/063* (2013.01); *G06F 40/289* (2020.01); *G10L 15/26* (2013.01)

(58) Field of Classification Search
CPC ....... G10L 15/063; G10L 15/06; G10L 15/26; G10L 15/28; G10L 2015/0631; G06F 40/289; G06F 40/295
See application file for complete search history.

(56) References Cited

U.S. PATENT DOCUMENTS

| 8,145,482 B2 | 3/2012 | Daya et al. |
| 2009/0292541 A1* | 11/2009 | Daya ..................... G10L 15/063 704/251 |
| 2019/0138270 A1* | 5/2019 | Dolph ..................... G10L 15/01 |

FOREIGN PATENT DOCUMENTS

| CN | 106095749 A | 11/2016 |
| CN | 106815194 A * | 6/2017 |

(Continued)

OTHER PUBLICATIONS

Japanese Patent Application No. 2019-149241 Office Action dated Sep. 29, 2020, 4 pages.

(Continued)

*Primary Examiner* — Huyen X Vo
*Assistant Examiner* — Darioush Agahi
(74) *Attorney, Agent, or Firm* — Lathrop GPM LLP

(57) ABSTRACT

Embodiments of the present disclosure provide a method and an apparatus for identifying a key phrase in audio, a device and a computer readable storage medium. The method for identifying a key phrase in audio includes obtaining audio data to be identified. The method further includes identifying the key phrase in the audio data using a trained key phrase identification model. The key phrase identification model is trained based on first training data for identifying feature information of words in a first training text and second training data for identifying the key phrase in a second training text. In this way, embodiments of the present disclosure can accurately and efficiently identify key information in the audio data.

9 Claims, 3 Drawing Sheets

(56) References Cited

FOREIGN PATENT DOCUMENTS

| CN | 106815194 A | | 6/2017 |
|---|---|---|---|
| CN | 107797992 A | * | 3/2018 |
| CN | 107797992 A | | 3/2018 |
| CN | 107818077 A | | 3/2018 |
| CN | 108133045 A | | 6/2018 |
| JP | 2004361873 A | | 12/2004 |
| JP | 2005292958 A | | 10/2005 |
| JP | 2016061954 A | | 4/2016 |

OTHER PUBLICATIONS

Japanese Patent Application No. 2019-149241 English translation of Office Action dated Sep. 29, 2020, 4 pages.
European Patent Application No. 19192012.3, extended Search and Opinion dated Dec. 17, 2019, 8 pages.
Chinese Patent Application No. 201810949733.8 Office Action dated May 8, 2020, 10 pages.
Chinese Patent Application No. 201810949733.8 English translation of Office Action dated May 8, 2020, 15 pages.

* cited by examiner

METHOD AND APPARATUS FOR IDENTIFYING KEY PHRASE IN AUDIO, DEVICE AND MEDIUM

CROSS REFERENCE TO RELATED APPLICATION

This application claims priority under 35 U.S.C. § 119(a) to Chinese Patent Application No. 201810949733.8, filed with the State Intellectual Property Office of P. R. China on Aug. 20, 2018, the entire contents of which are incorporated herein by reference.

TECHNICAL FIELD

Embodiments of the present disclosure generally relates to a field of data processing, and more particularly, to a method and an apparatus for identifying a key phrase in audio, a device and a computer readable storage medium.

BACKGROUND

With development of computer technology and popularization of intelligent terminals, people are increasingly using terminal devices such as smart phones or smart speakers to listen to a variety of audio programs, such as audio novels, children's stories, training courses or the like. Providers of audio resources usually upload recorded audio data to a server with a simple title and a text description, when a user searches these resources, the system usually only retrieves according to the title and the text description. Since it is not possible to understand the content of the audio data comprehensively and quickly, the searching effects may not meet the needs of the user. For example, the audio data will not be retrieved when the key word in a query command issued by the user is not included in the title or the text description of the audio data.

SUMMARY

According to embodiments of the present disclosure, there is provided a scheme for identifying key phrases in audio data.

In a first aspect of the present disclosure, there is provided a method for training a key phrase identification model. The method includes obtaining first training data for identifying feature information of words in a first training text. The method further includes obtaining second training data for identifying a key phrase in a second training text. The method further includes training the key phrase identification model based on the first training data and the second training data, to identify the key phrase in audio data.

In a second aspect of the present disclosure, there is provided a method for identifying a key phrase in audio. The method includes obtaining audio data to be identified. The method further includes identifying the key phrase in the audio data using a trained key phrase identification model. The key phrase identification model is trained based on first training data for identifying feature information of words in a first training text and second training data for identifying the key phrase in a second training text.

In a third aspect of the present disclosure, there is provided an apparatus for training a key phrase identification model. The apparatus includes a first obtaining module, a second obtaining module and a model training module. The first obtaining module is configured to obtain first training data for identifying feature information of words in a first training text. The second obtaining module is configured to obtain second training data for identifying a key phrase in a second training text. The model training module is configured to train the key phrase identification model based on the first training data and the second training data to identify the key phrase in audio data.

In a fourth aspect of the present disclosure, there is provided an apparatus for identifying a key phrase in audio, the apparatus includes an audio data obtaining module and an identifying module. The audio obtaining module is configured to obtain audio data to be identified. The identifying module is configured to identify the key phrase in the audio data using a trained key phrase identification model. The key phrase identification model is trained based on first training data for identifying feature information of words in a first training text and second training data for identifying the key phrase in a second training text.

In a fifth aspect of the present disclosure, there is provided an electronic device including one or more processors and a memory. The memory is configured to store one or more programs. When the one or more programs are executed by the one or more processors, the one or more processors are configured to implement the method according to the first aspect of the present disclosure.

In a sixth aspect of the present disclosure, there is provided an electronic device including one or more processors and a memory. The memory is configured to store one or more programs. When the one or more programs are executed by the one or more processors, the one or more processors are configured to implement the method according to the second aspect of the present disclosure.

In a seventh aspect of the present disclosure, there is provided a computer readable storage medium having a computer program stored thereon, wherein, when the program is executed by a processor, the program implements the method according to the first aspect of the present disclosure.

In an eighth aspect of the present disclosure, there is provided a computer readable storage medium having a computer program stored thereon, wherein, when the program is executed by a processor, the program implements the method according to the second aspect of the present disclosure.

It should be understood that, the content described in the summary is not intended to limit key or critical features of embodiments of the present disclosure, and not intended to limit the scope of the present disclosure. Other features of the present disclosure will be better appreciated from the following detailed description.

BRIEF DESCRIPTION OF THE DRAWINGS

These and other features, advantages, and aspects of embodiments of the present disclosure will become more apparent from the following descriptions made with reference to the accompanying drawings. In the drawings, like or similar reference number refer to like or similar element, in which.

DETAILED DESCRIPTION

Figure 1:
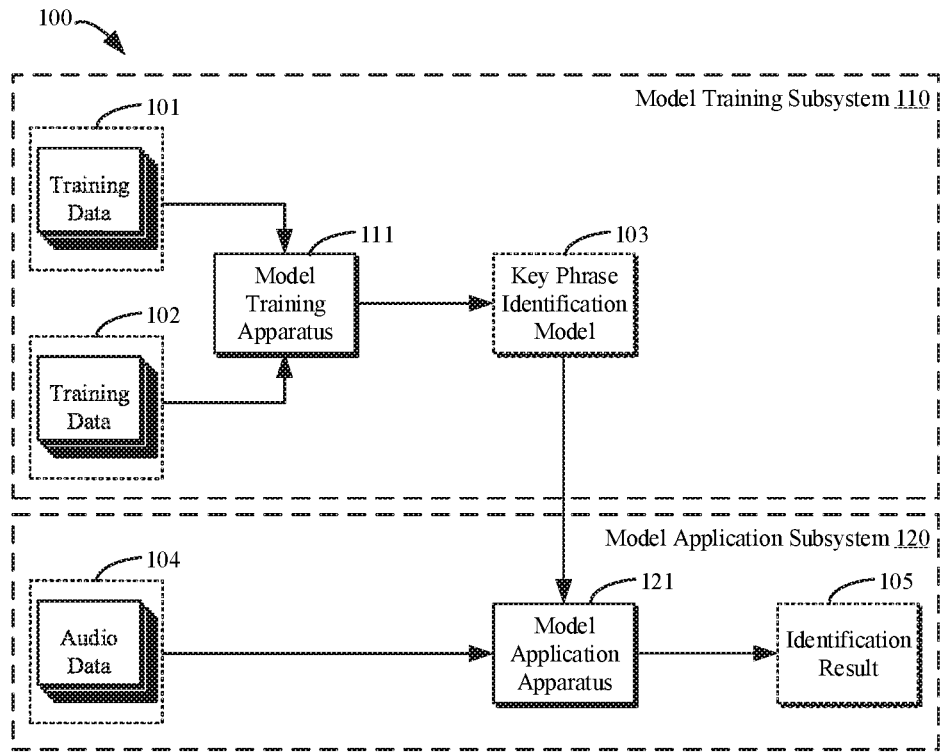
FIG. 1 is a schematic diagram illustrating an exemplary system in which the embodiments of the present disclosure may be implemented.

Embodiments of the present disclosure are described in detail with reference to the accompanying drawings below. Although certain embodiments of the present disclosure are shown in the drawings, it should be understood that, the present disclosure may be implemented in a variety of forms, and should not be construed as being limited to the embodiments set forth herein, instead, the embodiments are provided to provide a more complete understanding of the present disclosure. It should be understood that, the drawings and embodiments of the present disclosure are for illustrative purposes only and are not intended to limit the scope of the present disclosure.

In descriptions of embodiments of the present disclosure, the term "include" or the like should be understood as open inclusion, i.e., "including but not limited to". The term "based on" should be understood as "at least partially based on". The term "an embodiment" or "the embodiment" should be understood as "at least one embodiment". The terms "first", "second", or the like may refer to different or identical objects. Other explicit and implicit definitions may be included below.

As mentioned above, with the development of computer technology and the popularization of intelligent terminals, people are increasingly using terminal devices such as smart phones or smart speakers to listen to a variety of audio programs, such as audio novels, children's stories, training courses or the like. Providers of audio resources usually upload recorded audio data to a server with a simple title and a text description, when a user searches these resources, the system usually only retrieves according to the title and the text description. Since it is not possible to understand the content of the audio data comprehensively and quickly, the search effects may not meet the needs of the user. In such case, how to quickly understand the content of audio files so as to identify key words or key phrases therein accurately and efficiently becomes an urgent challenge. In the related art, the key words or key phrases (such as a main character in popular children's stories) in popular audio file are labeled manually, which is inefficient and cannot be used on a large scale. In addition, there are some schemes to retrieve key words or key phrases on a basis of text in the related art. However, those schemes cannot retrieve the audio data accurately and efficiently.

According to embodiments of the present disclosure, there is provided a scheme for identifying a key phrase in the audio. In this scheme, both training samples processed by a natural language processing and training samples labeled manually in sequence are used to train a key phrase identification model. This scheme converts the audio data to be identified into a corresponding text and uses the trained key phrase identification model to recognize the key words or key phrases in the text. In this way, this scheme can understand the content of the audio data accurately and efficiently and extract key information therein. Therefore, this scheme may be widely used in various audio applications or audio retrieval systems.

Embodiments of the present disclosure are described in detail with reference to the accompanying drawings below. In the present disclosure, a "model" may learn from the training data the correlation between respective inputs and outputs, therefore, so as to generate an output corresponding to a given input after the training is completed. It should be understood that the term "model" may also be referred as "neural network", "learning model" or "learning network". The term "key phrase" may refer to one or more key words that appear in a piece of content. The "key phrase" may be determined based on the user's intent, examples of which may include, but are not limited to, a main character, a particular scene, time, or a combination thereof in an audio content.

FIG. 1 is a schematic diagram illustrating an exemplary system 100 for implementing an embodiment of the present disclosure. The system 100 may generally include a model training subsystem 110 and a model application subsystem 120. It should be understood that, structures and functions of the system 100 are described for exemplary purposes only, and are not intended to imply any limitation on the scope of the present disclosure. The embodiments of the present disclosure may also be applied to environments with different structures and/or functions.

In the model training subsystem 110, a model training apparatus 111 may obtain first training data 101 and second training data 102 for training a key phrase identification model 103. For example, the first training data 101 may identify feature information of words in a first training text, and the second training data 102 may identify a key phrase in a second training text.

In some embodiments, the first training text or the second training text may be any text, or any text converted from the audio data. For example, the first training text may be obtained by converting a first audio sample which is used to train the key phrase identification model 103. The second training text may be obtained by converting a second audio sample which is used to train the key phrase identification model 103. In some embodiments, the first audio sample and the second audio sample may be the same or different audio data. That is, the first training text and the second training text may be the same or different.

In some embodiments, the first training data 101 may be generated by preprocessing the first training text. For example, the first training text may be split into a plurality of sentences by sentence separators (for example, various punctuation marks, etc.). Then, each of the plurality of sentences may be processed using a nature natural language processing technology to obtain feature information of each word in the sentences. For example, the feature information of the word may include at least one of the following information about the words: text, part of speech, semantic and/or syntax information, or the like. The part of speech in the feature information may indicate whether the word belongs to a noun, a verb, an adjective, an adverb, or the like. The semantic in the feature information, for example, may indicate the specific meaning of the word, such as a person, an action, an environment, or the like. The syntax information in the feature information may indicate whether the word belongs to a subject, a predicate, an object, an attributive, an adverbial or a complement of the sentence.

In some embodiments, the obtaining of the first training text and the generation of the first training data 101 may be performed partially or entirely by the model training apparatus 111. That is, the model training apparatus 111 may use any text as the first training text, or may convert the first audio sample into the first training text by using a speech recognition technology. In addition or alternatively, the model training apparatus 111 may generate the first training data 101 by itself based on the first training text.

Alternatively, in other embodiments, the obtaining of the first training text and the generation of the first training data 101 may be performed partially or entirely by other devices. In this case, the model training apparatus 111, for example, may obtain the first training data 101 generated in other devices for using in a model training directly.

In some embodiments, the second training data 102 may be generated by preprocessing the second training text. For example, the second training text may be split into a plurality of sentences by the sentence separators (e.g., various punctuation marks, etc.). Then, key phrases in each sentence may be labeled with a plurality of labels. In some embodiments, labels B (Begin), I (Inside), O (Outside) may be used to label the key phrases in the sentence manually. The label B (also referred as "a first label" here) is used to identify a starting character of a key phrase. The label I (also referred as "a second label" here) is used to identify a character in the key phrase other than the starting character. The label O (also referred as "a third label" here) is used to identify other characters in the sentence that do not belong to the key phrase.

For example, assuming that the sentence to be labeled is "Snow White and the seven dwarfs are in the forest", and the key phrases to be labeled are the main characters (i.e., "Snow White" and "seven dwarfs") of the sentence. Then, the characters "Snow" and "seven" are labeled by a label B respectively; the characters "White" and "dwarfs" are labeled by a label I respectively; and the rest characters are labeled by a label O. Still taking the sentence "Snow White and the seven dwarfs are in the forest" as an example, assuming that the key phrase to be labeled is the scenario (i.e., "forest") in the sentence, the character "f" is labeled by the label B; the characters "orest" is labeled by the label I; and the rest characters are labeled by the label O.

In the above example, the labels B, I, and O are used to illustrate the manual labeling of the key phrases in the second training text. However, it should be understood that, this is merely for illustrative purposes and is not intended to limit the present disclosure. In other embodiments of the present disclosure, the key phrases in the second training text may also be labeled using labels other than the labels B, I, and O, which is not limited here.

In some embodiments, the obtaining of the second training text and the generation of the second training data 102 may be performed partially or entirely by the model training apparatus 111. That is, the model training apparatus 111 may use any text as the second training text, or may convert the second audio sample into the second training text by using the speech recognition technology. In addition or alternatively, the model training apparatus 111 may generate the first training data 102 by itself based on the second training text.

Alternatively, in other embodiments, the obtaining of the second training text and the generation of the second training data 102 may be performed partially or entirely by other devices. In this case, the model training apparatus 111, for example, may obtain the generated second training data 101 from the other devices for using in a model training directly.

In some embodiments, the model training apparatus 111 may train the key phrase identification model 103 based on the first training data 101 and the second training data 102. For example, examples of the key phrase identification model 103 may include, but not be limited to, a recursive neural network model (for example, a long-term and short-term memory (LSTM) model), a convolutional neural network (CNN) model or the like. The trained key phrase identification model 103 may be used to identify the key phrases in the audio data.

As illustrated in FIG. 1, in the model application subsystem 120, a model application apparatus 121 may obtain audio data 104 to be identified, and identify the key phrases in the audio data 104 using the trained key phrase identification model 103. The audio data 104 may include any audio files, audio data streams or the like, to be identified. For example, the model application apparatus 121 may obtain the audio data streams to be identified in real time, or obtain the audio files to be identified from a specific storage apparatus, as the audio data 104.

In some embodiments, the model application apparatus 121 may convert the audio data 104 into a corresponding text using a speech recognition technology, and split the obtained text into one or more sentences according to the sentence separators. Then, the model application apparatus 121 may determine a corresponding label for a character in each sentence using the key phrase identification model 103, and identify the key phrases in the sentence based on the corresponding label.

In some embodiments, for example, in the second training data 102 used for training key phrase identification model 103, the labels B, I, and O are used to label the key phrases in the second training text. In this case, the model application apparatus 121 may identify the label of each character in each sentence as one of the labels B, I and O by using the key phrase identification model 103. The label B may indicate a character as being a starting character of a key phrase. The label I may indicate the character as being a character in the key phrase other than the starting character. The label O may indicate the character as not belonging to the key phrase. Further, the model application apparatus 121 may identify a set consisting of the starting character identified by the label B and the character identified by the label I as the key phrase. Alternatively, in some other embodiments, in the second training data 102 for training the key phrase identification model 103, the key phrases in the second training text may be labeled using a plurality of labels other than the labels B, I and O. In this case, the model application apparatus 121 may to determine a corresponding label for a character or word in each sentence, for example, as one of a plurality of other labels using the key phrase identification model 103, and further identify the key phrases based on the determined labels.

Figure 2:
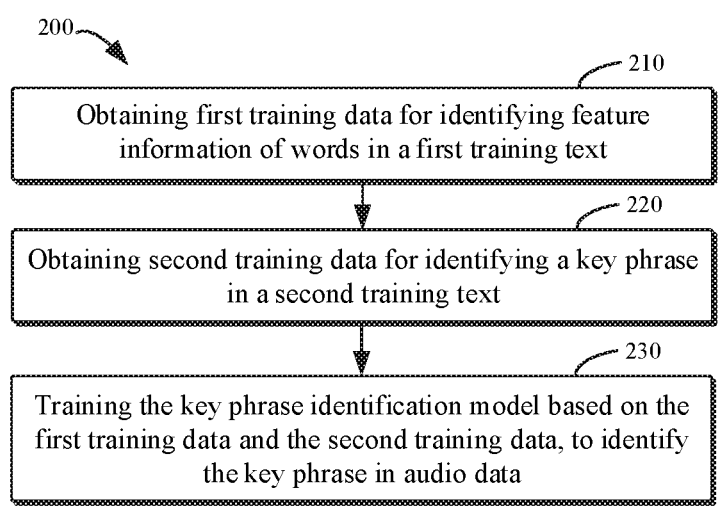
FIG. 2 is a flow chart illustrating a method for training a key phrase identification model according to an embodiment of the present disclosure.

FIG. 2 is a flow chart illustrating a method 200 for training a key phrase identification model according to an embodiment of the present disclosure. For example, the method 200 may be performed by the model training apparatus 111 as illustrated in FIG. 1. The steps of the method 200 will be described in detail with reference to FIG. 1 below. It should be understood that, the method 200 may also include additional steps that are not illustrated and/or omit steps that are illustrated. The scope of the present disclosure is not limited in this regard.

At block 210, the first training data 101 are obtained by the model training apparatus 111. For example, the first training data 101 may identify feature information of words in the first training text.

In some embodiments, the first training text may be obtained and preprocessed to generate the first training data 101. For example, any text may be obtained as the first training text. For example, a first audio sample used for training key phrase identification model 103 may be obtained and converted into the first training text by a speech recognition technology. In some embodiments, the first training data 101 may be generated by: splitting the first training text into at least one sentence according to the sentence separators; and determining feature information of words in at least one sentence using a natural language processing technology. For example, the feature information includes at least one of the following information about the words: text, part of speech, semantic meaning and syntax information.

At block 220, the second training data 102 may be obtained by the model training apparatus 111. For example, the second training data 102 may identify the key phrases in the second training text. The "key phrase" described here may be determined based on the user's intent, examples of which may include, but are not limited to, a main character, a particular scene, time, or a combination thereof in the second training text.

In some embodiments, the second training text may be obtained and preprocessed to generate the second training data 102. For example, any text may be obtained as the second training text. For example, a second audio sample used for training key phrase identification model 103 may be obtained and converted into the second training text using a speech recognition technology. In some embodiments, the second training data 102 may be generated by: splitting the second training text into at least one sentence according to the sentence separators; and identifying the key phrases in at least one sentence using a plurality of labels. For example, a starting character of the key phrase may be identified using a first label; a subsequent character of the key phrase that follows the starting character may be identified using a second label; and a character in the sentence that does not belong to the key phrase may be identified using the third label.

At block 230, the key phrase identification model 103 is trained by the model training apparatus 111 based on the first training data 101 and the second training data 102. For example, examples of the key phrase identification model 103 may include, but not be limited to, a recursive neural network model (for example, a long-term and short-term memory (LSTM) model), a convolutional neural network (CNN) model or the like. The trained key phrase identification model 103 may be used to identify the key phrase in audio data.

Figure 3:
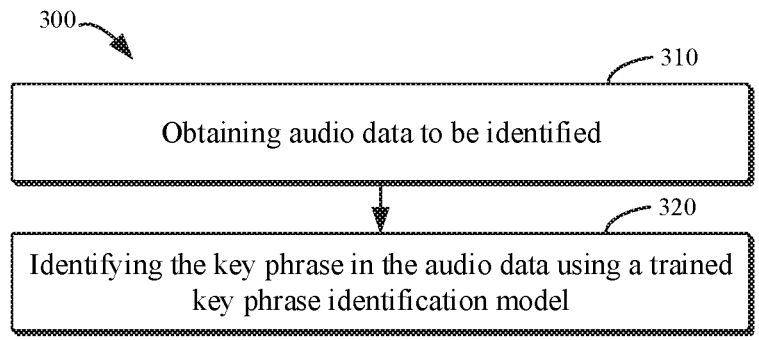
FIG. 3 is a flow chart illustrating a method for identifying a key phrase in audio according to an embodiment of the present disclosure.

FIG. 3 is a flow chart illustrating a method 300 for identifying a key phrase in audio according to an embodiment of the present disclosure. For example, the method 300 may be implemented by the model application apparatus 121 as illustrated in FIG. 1. The steps of the method 300 are described in detail with reference to FIG. 1 below. It should be understood that, the method 300 may also include additional steps that are not illustrated and/or omit steps that are illustrated. The scope of the present disclosure is not limited in this regard.

At block 310, audio data 104 to be identified are obtained by the model application apparatus 121. For example, the audio data 104 may include any audio files, audio data streams or the like, to be identified. In some embodiments, the model application apparatus 121 may obtain the audio data streams to be identified in real time as the audio data 104. Alternatively, the model application apparatus 121 may obtain the audio files from a specific storage apparatus as the audio data 104.

At block 320, the key phrases in the audio data 104 is identified using the trained key phrase recognition model 103.

In some embodiments, the model application apparatus 121 may convert the audio data 104 into a corresponding text using a speech recognition technology, and split the obtained text into one or more sentences according to the sentence separators. Then, the model application apparatus 121 may determine a corresponding label for a character in each sentence using the key phrase identification model 103, and identify the key phrases in the sentence based on the corresponding label.

In some embodiments, for example, the labels of the characters may include one of a first label for indicating the character as being a starting character of the key phrase; a second label for indicating the characters as being a subsequent character of the key phrase; and a third label for indicating the character as not belonging to the key phrase. In some embodiments, the model application apparatus 121 may identify a set consisting of the starting character identified by the first label and the subsequent characters identified by the second label, as the key phrase.

As can be seen from the above description, the embodiments of the present disclosure propose a scheme for identifying a key phrase in the audio data. In this scheme, both training samples processed by a natural language processing and training samples labeled manually in sequence are used to train a key phrase identification model. This scheme converts the audio data to be identified into a corresponding text and uses the trained key phrase identification model to recognize the key words or key phrases in the text. In this way, this scheme can understand the content of the audio data accurately and efficiently and extract key information therein. Therefore, this scheme may be widely used in various audio applications or audio retrieval systems.

Figure 4:
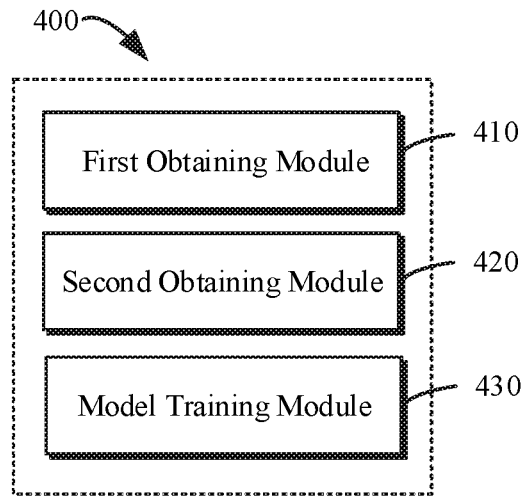
FIG. 4 is a block diagram illustrating an apparatus for training a key phrase identification model according to an embodiment of the present disclosure.

FIG. 4 is a block diagram illustrating an apparatus 400 for training a key phrase identification model according to an embodiment of the present disclosure. As illustrated in FIG. 4, the apparatus 400 may include a first obtaining module configured to obtain first training data for identifying feature information of words in a first training text. The apparatus 400 may further include a second obtaining module 20 configured to obtain second training data for identifying a key phrase in a second training text. The apparatus 400 may further include a model training module 430 configured to train the key phrase identification model based on the first training data and the second training data to identify the key phrase in audio data.

In some embodiments, the first obtaining module 410 includes a first obtaining unit and a first preprocessing unit. The first obtaining unit is configured to obtain the first training text. The first preprocessing unit is configured to generate the first training data by preprocessing the first training text.

In some embodiments, the first obtaining unit is further configured to obtain a first audio sample for training the key phrase identification model; and to convert the first audio sample into the first training text using a speech recognition technology.

In some embodiments, the first preprocessing unit is further configured to split the first training text into at least one sentence; and to determine the feature information of the words in the at least one sentence using a natural language processing technology.

In some embodiments, the feature information includes at least one of the following information about the words: text, part of speech, semantic and syntax information.

In some embodiments, the second obtaining module 420 includes a second obtaining unit and a second preprocessing unit. The second obtaining unit is configured to obtain the second training text. The second preprocessing unit is configured to generate the second training data by preprocessing the second training text.

In some embodiments, the second obtaining unit is further configured to obtain a second audio sample for training the key phrase identification model; and to convert the second audio sample into the second training text using a speech recognition technology. In some embodiments, the second preprocessing unit is further configured to split the second training text into at least one sentence; and to identify the key phrase in the at least one sentence using a plurality of labels.

In some embodiments, the second preprocessing unit is further configured to identify a starting character of the key phrase using a first label; identify a subsequent character of the key phrase using a second label, the subsequent character following the starting character; and identify a character in the at least one sentence that does not belong to the key phrase using a third label.

Figure 5:
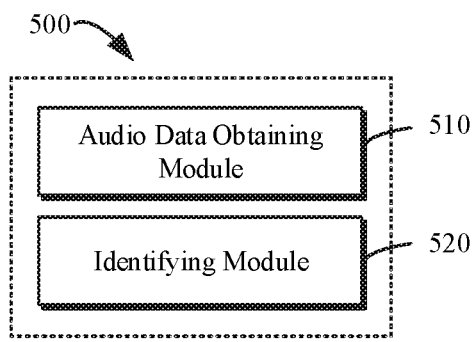
FIG. 5 is a block diagram illustrating an apparatus for identifying a key phrase in audio according to an embodiment of the present disclosure.

FIG. 5 is a block diagram illustrating an apparatus 500 for identifying a key phrase in audio according to an embodiment of the present disclosure. As illustrated in FIG. 5, the apparatus 500 may include an audio data obtaining module 510 which is configured to obtain audio data to be identified. The apparatus 500 may further include an identifying module 520 which is configured to identify the key phrase in the audio data using a trained key phrase identification model. The key phrase identification model is trained based on first training data for identifying feature information of words in a first training text and second training data for identifying the key phrase in a second training text.

In some embodiments, the identifying module 520 includes a data converting unit, a text splitting unit, a label determining unit and an identifying unit. The data converting unit is configured to convert the audio data into a text corresponding to the audio data using a speech recognition technology. The text splitting unit is configured to split the text into at least one sentence. The label determining unit is configured to determine a corresponding label for a character in the at least one sentence using the key phrase identification model. The identifying unit is configured to identify the key phrase in the audio data based on the corresponding label.

In some embodiments, the corresponding label include one of: a first label for indicating the character as being a starting character of the key phrase; a second label for indicating the character as being a subsequent character of the key phrase, the subsequent character following the starting character; and a third label for indicating the characters as not belonging to the key phrase.

In some embodiments, the identifying unit is further configured to identify a set consisting of the starting character identified by the first label and the subsequent character identified by the second label, as the key phrase.

Figure 6:
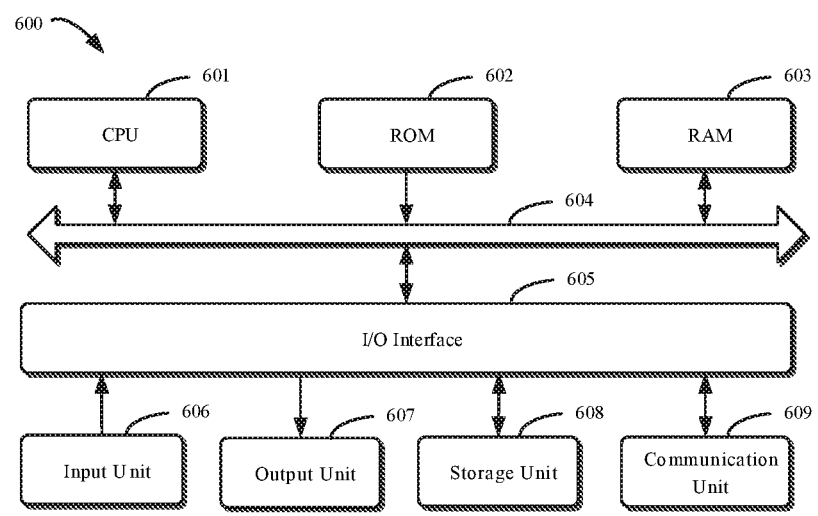
FIG. 6 is a block diagram illustrating a computing device capable of implementing the embodiments of the present disclosure.

FIG. 6 is a block diagram illustrating an exemplary device 600 that may be used for implementing the embodiments of the present disclosure. The device 600 can be configured to implement the model training apparatus 111 and/or the model application apparatus 121, as illustrated in FIG. 1. As illustrated, the device 600 includes a central processing unit (CPU) 601, capable of performing various appropriate operations and processes according to computer program instructions stored in a read-only memory (ROM) 602 or computer program instructions loaded from a storage unit 608 into a random-access memory (RAM) 603. In the RAM 603, various programs and data necessary for the operation of the device 600 may also be stored. The CPU 601, the ROM 602 and RAM 603 may be connected to each other via the bus 604. The input/output (I/O) interface 605 may also be connected to the bus 604.

A plurality of components in the device 600 are connected to the I/O interface 605, including: an input unit 606 such as a keyboard, a mouse, or the like; an output unit 607, such as various types of displays, speakers, or the like; the storage unit 608, such as a magnetic disk, an optical disk, or the like; and a communication unit 609, such as a network card, a modem, a wireless communication transceiver, or the like. The communication unit 609 allows the device 600 to exchange information/data with other devices over computer networks such as the Internet and/or various telecommunications networks.

The processing unit 601 may perform the various methods and processes described above, such as the method 400 and/or 500. For example, in some embodiments, the method 200, 300, and 400 may be implemented as computer software programs that are tangibly included in the machine readable medium, such as the storage unit 608. In some embodiments, part or all of the computer programs may be loaded and/or installed on the device 600 via the ROM 602 and/or the communication unit 609. When the computer program is loaded into the RAM 603 and executed by the CPU 601, one or more steps of the method 200, 300, and 400 described above can be performed. Alternatively, in other embodiments, the CPU 601 may be configured as the method 400 and/or 500 by any other suitable means (for example, by means of firmware).

The functions described above may be performed at least in part by one or more hardware logic components. For example, without limitation, exemplary types of hardware logic components may include: the field programmable gate array (FPGA), the application specific integrated circuit (ASIC), the application specific standard product (ASSP), the system on chip (SOC), the complex programmable logic device (CPLD), or the like.

Program codes for implementing operations of embodiments of the present disclosure may be written in any combination of one or more programming languages. The program codes may be provided to processor or the controller of a general-purpose computer, a special purpose computer, or other programmable data-processing devices, such that when executed by the processor or controller, causes the functions/operations specified in the flowchart and/or the block diagram to be implemented. The program codes may be executed entirely on the machine, partially on the machine, as a separate software package, partially on the remote machine, or entirely on the remote machine or server.

In the context of the present disclosure, the machine-readable medium may be a tangible medium that may include or store programs that can be used by or in conjunction with the instruction execution system, apparatus, or device. The machine-readable medium may be the machine-readable signal medium or the machine-readable storage medium. The machine-readable medium may include, but is not limited to, an electrical, magnetic, optical, electromagnetic, infrared, or semiconductor system, apparatus, device, component or any combination thereof. More specific examples (a non-exhaustive list) of the computer readable storage medium include: an electrical connection having one or more wires, a portable computer disk, a hard disk, a random access memory (RAM), a read only memory (ROM), an Erasable Programmable Read Only Memory (EPROM) or a flash memory, an optical fiber, a compact disc read-only memory (CD-ROM), an optical memory component, a magnetic memory component, or any suitable combination thereof.

In addition, although acts or steps are described in the particular order, it should be understood that, such acts or steps that are required to be performed in the particular or sequence order shown, or that all illustrated acts or steps should be performed to achieve the desired results. Multitasking and parallel processing may be advantageous under certain circumstances. Similarly, although some implementation details are described above, these should not be construed as limiting the scope of the present disclosure. Certain features described in the context of the separate embodiment may also be implemented in combination in the single implementation. Instead, the various features described in the context of the single implementation may also be implemented in a plurality of implementations, either individually or in any suitable sub-combination.

Although embodiments of the present disclosure have been described in language specific to structural features and/or methodological acts, it should be understood that, the subject matter defined in the appended claims is not limited to the particular features or acts described above. Instead, the specific features and acts described above are merely exemplary forms of implementing the claims.

What is claimed is:

1. A method for training a key phrase identification model, comprising: obtaining first training data for identifying feature information of words in a first training text; obtaining second training data for identifying a key phrase in a second training text; and training the key phrase identification model to be used as a neural network, based on the first training data and the second training data, so as to identify the key phrase in audio data by using the trained key phrase identification model, wherein obtaining the first training data comprises: obtaining the first training text; splitting the first training text into at least one sentence; and determining the feature information of the words in the at least one sentence using a natural language processing technology, and wherein obtaining the second training data comprises: obtaining the second training text; splitting the second training text into at least one sentence; and identifying the key phrase in the at least one sentence using a plurality of labels, wherein identifying the key phrase in the audio data by using the trained key phrase identification model comprises: determining a corresponding label for a character in each sentence in a text converted from the audio data by using the key phrase identification model, and identifying the key phrases in the sentence based on the corresponding label, wherein identifying the key phrases in the sentence based on the corresponding label comprises: in response to identifying a starting character identified by a first label, a subsequent character identified by a second label, and a character identified by a third label in the at least one sentence that does not belong to the key phrase, identifying a set consisting of the starting character identified by the first label and the subsequent character identified by the second label as the key phrase.

2. The method of claim 1, wherein obtaining the first training text includes:
obtaining a first audio sample for training the key phrase identification model; and
converting the first audio sample into the first training text using a speech recognition technology.

3. The method of claim 1, wherein the feature information includes at least one of the following information about the words: text, part of speech, semantic meaning and syntax information.

4. The method of claim 1, wherein obtaining the second training text includes:
obtaining a second audio sample for training the key phrase identification model; and
converting the second audio sample into the second training text using a speech recognition technology.

5. The method of claim 1, wherein identifying the plurality of key phrases in the at least one sentence using the plurality of labels includes: identifying the starting character of the key phrase using the first label; identifying the subsequent character of the key phrase using the second label, the subsequent character following the starting character.

6. A method for identifying a key phrase in audio, comprising: obtaining audio data to be identified; and identifying the key phrase in the audio data by using a trained key phrase identification model as a neural network, wherein the key phrase identification model is trained based on first training data for identifying feature information of words in a first training text and second training data for identifying the key phrase in a second training text, wherein obtaining the first training data comprises: obtaining the first training text; splitting the first training text into at least one sentence; and determining the feature information of the words in the at least one sentence using a natural language processing technology, and wherein obtaining the second training data comprises: obtaining the second training text; splitting the second training text into at least one sentence; and identifying the key phrase in the at least one sentence using a plurality of labels, wherein identifying the key phrase in the audio data by using the trained key phrase identification model comprises: determining a corresponding label for a character in each sentence in a text converted from the audio data by using the key phrase identification model, and identifying the key phrases in the sentence based on the corresponding label, wherein identifying the key phrases in the sentence based on the corresponding label comprises: in response to identifying a starting character identified by a first label, a subsequent character identified by a second label, and a character identified by a third label in the at least one sentence that does not belong to the key phrase, identifying a set consisting of the starting character identified by the first label and the subsequent character identified by the second label as the key phrase.

7. The method of claim 6, wherein identifying the key phrase in the audio data includes:
converting the audio data into a text corresponding to the audio data using a speech recognition technology;
splitting the text into at least one sentence;
determining a corresponding label for a character in the at least one sentence using the key phrase identification model; and
identifying the key phrase in the audio data based on the corresponding label.

8. The method of claim 7, wherein the corresponding label includes one of: the first label for indicating the character as being the starting character of the key phrase; the second label for indicating the character as being the subsequent character of the key phrase, the subsequent character following the starting character; and the third label for indicating the character as not belonging to the key phrase.

9. An apparatus for training a key phrase identification model, comprising: one or more processors, and a storage device, configured to store one or more programs, wherein, when the one or more programs are executed by the one or more processors, the one or more processors are configured to implement a method for training a key phrase identification model, comprising: obtaining first training data for identifying feature information of words in a first training text; obtaining second training data for identifying a key phrase in a second training text; and training the key phrase identification model to be used as a neural network, based on the first training data and the second training data, so as to identify the key phrase in audio data by using the trained key phrase identification model, wherein obtaining the first training data comprises: obtaining the first training text; splitting the first training text into at least one sentence; and determining the feature information of the words in the at least one sentence using a natural language processing technology, and wherein obtaining the second training data comprises: obtaining the second training text; splitting the second training text into at least one sentence; and identifying the key phrase in the at least one sentence using a plurality of labels, wherein identifying the key phrase in the audio data by using the trained key phrase identification model comprises: determining a corresponding label for a character in each sentence in a text converted from the audio data by using the key phrase identification model, and identifying the key phrases in the sentence based on the corresponding label, wherein identifying the key phrases in the sentence based on the corresponding label comprises: in response to identifying a starting character identified by a first label, a subsequent character identified by a second label, and a character identified by a third label in the at least one sentence that does not belong to the key phrase, identifying a set consisting of the starting character identified by the first label and the subsequent character identified by the second label as the key phrase.

* * * * *